July 30, 1940.  A. F. MAACK ET AL  2,209,784
BRAKE BLEEDING DEVICE
Original Filed April 6, 1936   2 Sheets-Sheet 1
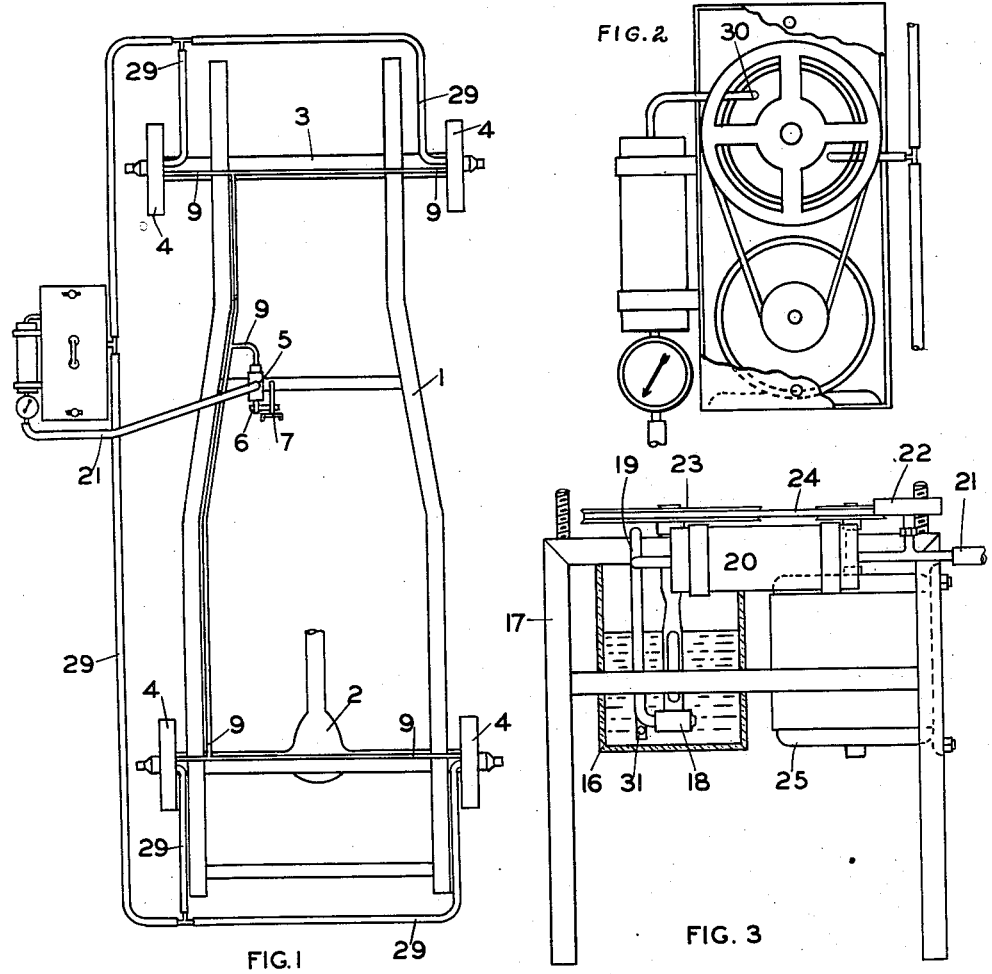
FIG. 1
FIG. 2
FIG. 3
FIG. 4
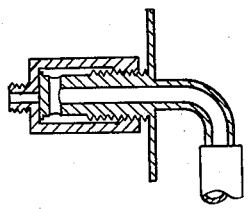
FIG. 5
ARTHUR F. MAACK
PAUL E. GIESELMAN
INVENTORS.
BY *George R. Ericson*
ATTORNEY.

July 30, 1940.　　A. F. MAACK ET AL　　2,209,784
BRAKE BLEEDING DEVICE
Original Filed April 6, 1936　　2 Sheets-Sheet 2

ARTHUR F. MAACK
PAUL E. GIESELMAN
INVENTORS.

BY George R. Ericson
ATTORNEY.

Patented July 30, 1940

2,209,784

UNITED STATES PATENT OFFICE 2,209,784

BRAKE BLEEDING DEVICE

Arthur F. Maack, St. Louis County, and Paul E. Gieselman, Vinita Park, Mo.

Application April 6, 1936, Serial No. 72,938
Renewed April 13, 1939

4 Claims. (Cl. 188—152)

This invention relates to brake bleeding devices, and its general purpose is to provide an arrangement for insuring the complete elimination of air from a hydraulic braking system.

It is well known that in hydraulic brake systems for automotive vehicles, the presence of air in the passages leading from the master cylinder to the brake operating cylinders prevents efficient operation and the elimination of air from the system is of the highest importance. Various methods have been used for eliminating such air and the usual method heretofore practiced is to jack-up one end of the chassis at a time so that the conduits leading to the brakes at that end will be inclined upwardly and then to open a bleed hole at each of the brake operating cylinders at the raised end, so that the air bubbles tended to rise and escape. This movement of the air may be assisted to some extent by operating the brake pedal to discharge fluid from the master cylinder, but this expedient is not very satisfactory because the release of the brake pedal causes air to be sucked into the open end of the conduit, and furthermore, the loss of a substantial amount of brake fluid is likely to result.

An object of our invention is to provide a device for establishing a comparatively rapid flow of brake fluid from the master cylinder to the operating cylinders and out through a bleed hole so that any air present in the conduit will be washed out through the bleed hole, after which elimination of air the bleed hole is closed, while the flow of brake fluid still continues until positively cut-off.

A further object of our invention is to provide an arrangement of the character described in the preceding paragraph and in which the flow of brake fluid from the master cylinder to the operating cylinders is sufficiently rapid to carry off any air bubbles without the necessity for raising one end of the chassis to assist the movement thereof.

A further object of our invention is to provide an arrangement whereby the brake fluid is continuously circulated from a main tank to the master cylinder, then to the operating cylinders, out the bleed hole and back to the main tank, the system including means for separating the air from the brake fluid so that no air will be injected into the master cylinder.

A further object of our invention is to provide a system in which the brake fluid is filtered before being injected into the master cylinder.

Other objects of our invention will appear from the following description and accompanying drawings, in which like reference numerals refer to like parts throughout and in which:

Figure 1 is a diagrammatic plan view of an automobile chassis, having hydraulic brakes and having our brake bleeding device attached thereto.

Figure 2 is a plan view of tht supply tank, pump and filter unit of our brake bleeding device.

Figure 3 is a side elevation of the device shown in Figure 2.

Figure 4 is an end view of a swivel coupling used in connecting the return lines of our system to the main tank.

Figure 5 is a sectional view of the device shown in Figure 4.

Figure 6:
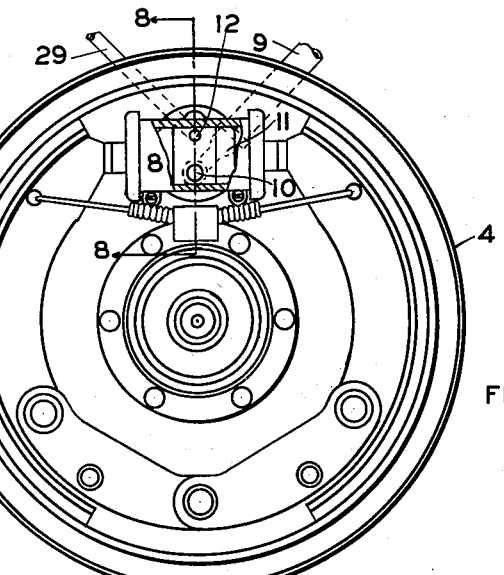
Figure 6 is a diagrammatic view of a hydraulic brake having our bleeding device connected thereto.
Figure 7:
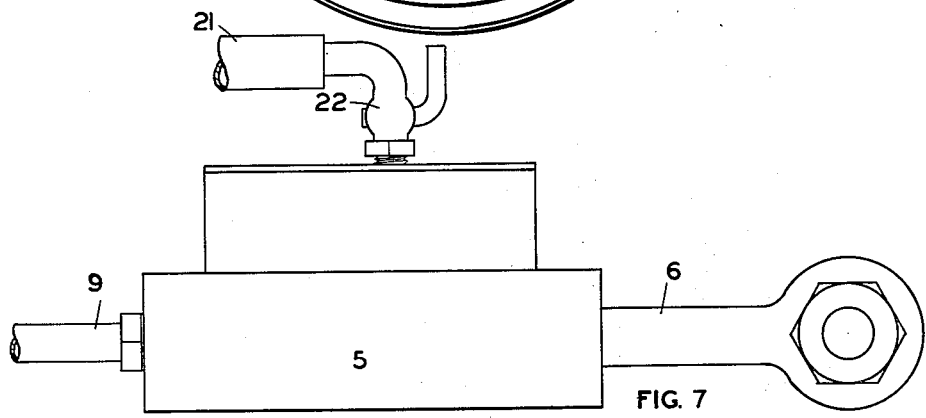
Figure 7 is a diagram of a brake cylinder having our bleeding device connected thereto.
Figure 8:
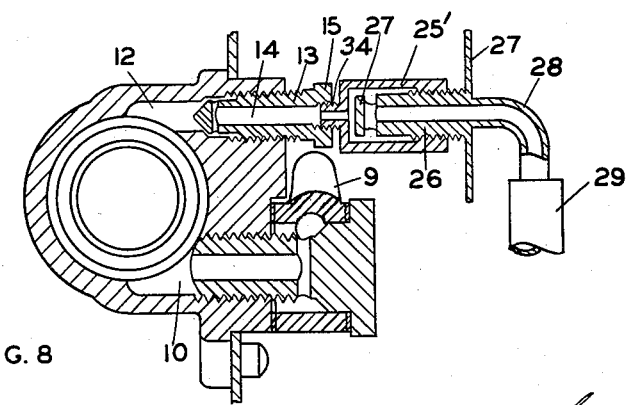
Figure 8 is a sectional view of the device shown in Figure 6, taken along the line 8—8, looking in the direction indicated by the arrows.

The reference numeral 1 indicates the chassis of an automobile having a rear axle 2 and a front axle 3, equipped with hydraulic brakes diagrammatically indicated at 4. A master brake cylinder 5 is provided with an operating piston 6 connected to the brake pedal 7 in the usual manner. The master cylinder is connected to the operating cylinders 8 by means of a branched conduit 9. The brake cylinders are provided with inlets as indicated at 10 to admit the operating fluid from the conduit 9 between the operating piston 11. Bleed holes 12 from the upper parts of the cylinders are normally closed by a bleed valve 13. These bleed valves are provided with outlet passages 14 and polygonal portions 15 so that the valve may be operated by a wrench. This structure is all conventional.

We provide a main tank 16 made of glass or any other suitable material mounted on a table 17 which may be portable if desired. This tank is filled with brake fluid and is provided with a pump 18 having a discharge outlet 19 leading up over the top of the tank and into a filter 20. The outlet of the filter discharges into a conduit 21 which is provided with a pressure gauge 22. The pump is operated by a pulley 23 driven by a belt 24 which, in turn, is driven by a motor 25. The motor is provided with the usual connections (not shown) by means of which necessary current is supplied.

Conduit 21 is provided with means including a manually controlled valve 22 which may be connected to the brake cylinder at a point between the piston and the discharge outlet. By operation of the motor and pump 18, brake fluid may be supplied continuously under pressure to the brake cylinder.

In order to provide a return for the brake fluid to the main tank, we screw-thread the bore of the bleed valve 13 as indicated at 34 and provide a swivel coupling for attachment thereto. The swivel coupling comprises the member 25' which is screwed into the bleed valve 13 and a thread valve member 26 provided with a handle 27 and an outlet tube 28 which, in turn, is connected to the main tank by means of a series of conduits 29. It will be understood that the main tank is open to the atmosphere and that the series of conduits 29 discharge into the same as indicated at 30.

In operation, the set of four swivel couplings 25 are attached to the bleed valve 13 by means of a screw thread 34 and the bleed valves are opened by unscrewing to a sufficient extent to permit fairly rapid movement of the brake fluid. The discharge conduit 21 is then connected to the master cylinder and the pump 18 is set in operation. This causes a circulation of brake fluid through the filter 20, the discharge conduit 21 and the brake system from which the brake fluid and any air that may be present escapes through the bleed holes 12 into the return conduits 29 and the main tank.

Upon discharging into the main tank, any air that may be present is, of course, separated out by gravity. When circulation has been maintained for sufficient time to insure the washing out of all air from the brake piston, the bleed valves 13 are closed and the swivel couplings 25 are detached, it being noted that the member 26 is provided with a valve head 27 so that the entrance to the tube 28 may be completely closed by screwing down the member 25. The outlet conduit 21 is then detached from the master cylinder, the opening having been closed by means of the manually operable valve 22. A second valve may be provided, if desired for the purpose of controlling the outlet of the conduit 21. It will also be understood that the pump 18 is of the type provided with a relief valve or other means to prevent breakage when the discharge is cut off by means of the valves 13 or 22.

The invention is susceptible of many modifications and, accordingly, we do not wish to be limited except as set forth in the following claims.

We claim:

1. A device for expelling the air from hydraulic brake systems comprising a supply tank, a pump for receiving fluid from said supply tank and delivering it under pressure, an outlet for said pump, a filter in said outlet, a connection leading from said filter and provided with quickly attachable and detachable means for connecting it to the master cylinder of a hydraulic brake system, and a quick detachable connection for connecting said supply tank with an operating cylinder of said brake system.

2. The method of removing air from hydraulic brake systems which comprises steadily circulating fluid under constant pressure through said system and removing any air from said fluid at a point outside said system.

3. The method of removing the air from a hydraulic brake system which comprises the continuous introduction of brake fluid into a central part of said system, continuously removing fluid from another part of said system, removing any air from said fluid by settling at a point outside said system, filtering the fluid after the said removal of air, and introducing the fluid to the system at said central point.

4. A device for expelling air from hydraulic brake systems comprising a supply tank, a pump for receiving fluid from said supply tank and delivering it under pressure, an outlet for said pump, conduit means leading from said pump and provided with quickly attachable and detachable means for connecting it to the master cylinder of a hydraulic brake system, and a quick detachable connection for connecting said supply tank with an operating cylinder of said brake system whereby liquid may be pumped into said master cylinder from said supply tank and returned to said supply tank from said operating cylinder.

ARTHUR F. MAACK.
PAUL E. GIESELMAN.